Sept. 28, 1943.     O. W. MARSH     2,330,369
APPARATUS FOR MOLDING PLASTIC MATERIAL
Filed June 28, 1940
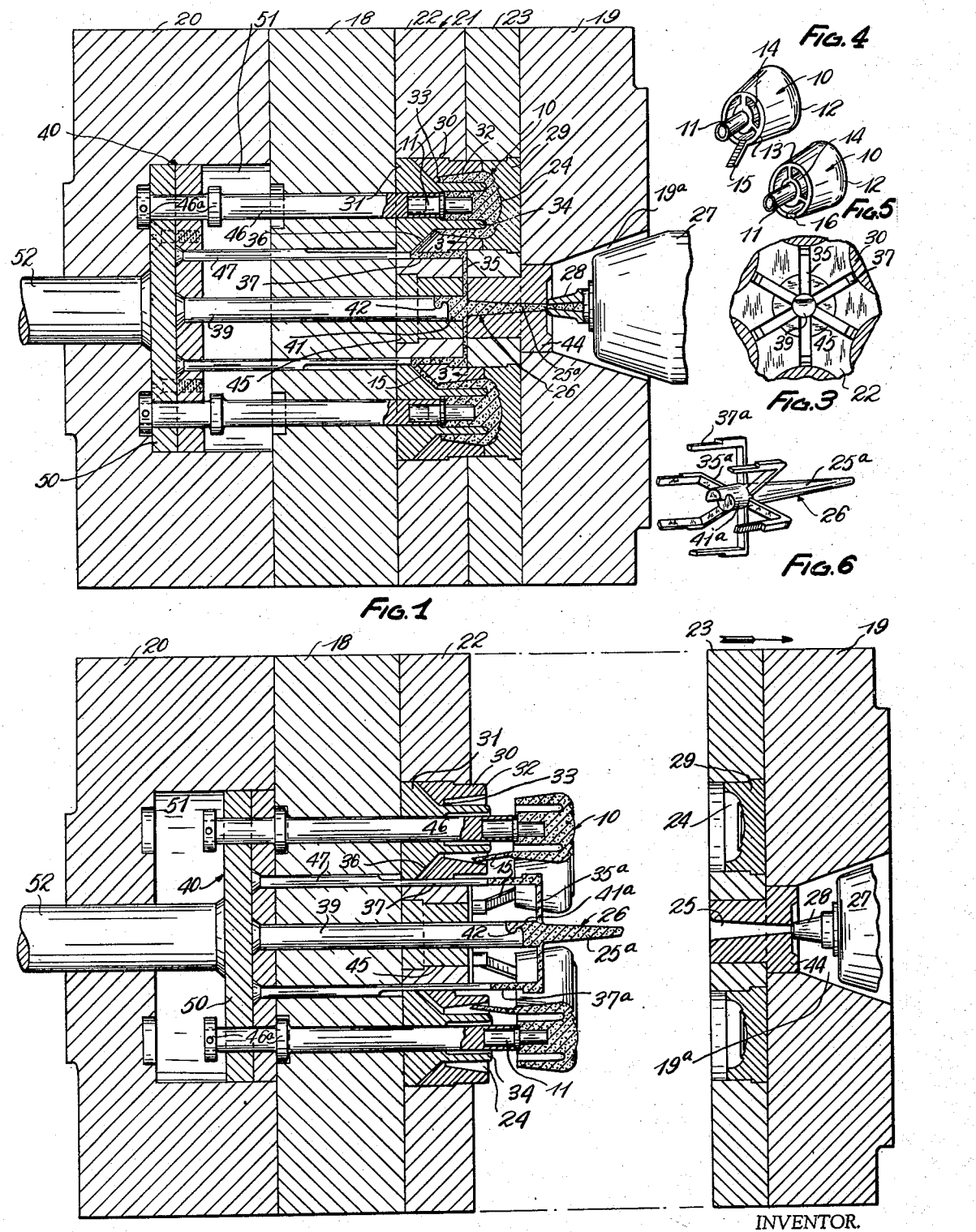
INVENTOR.
ORLO W. MARSH
BY Kwis Hudson & Kent
ATTORNEYS Patented Sept. 28, 1943

2,330,369

UNITED STATES PATENT OFFICE 2,330,369

APPARATUS FOR MOLDING PLASTIC MATERIAL

Orlo W. Marsh, Elyria, Ohio, assignor to The General Industries Company, Elyria, Ohio, a corporation of Ohio Application June 28, 1940, Serial No. 342,994

5 Claims. (Cl. 18—42)

This invention relates to the molding of plastic material, and more particularly to improved apparatus by which the molding of articles from plastic material can be carried out more satisfactorily than heretofore, and with a materially smaller percentage of imperfect articles required to be scrapped.

In the molding of small articles, such as knobs or the like from plastic material it has been common practice to use a multiple-cavity mold having a gate opening with a plurality of radiating passages or extensions leading to the individual cavities. The plastic material is forced into the mold in a heated condition and under pressure in the manner known in the art as "injection molding" and fills the gate opening and passages as well as the individual cavities. At the completion of the molding operation the mold is opened and the articles and gate or sprue are removed from the mold as a unit, the individual articles being attached to the arms or stems formed on the gate by the radiating passages leading to the individual mold cavities. The individual articles are then broken or otherwise separated from the arms of the gate which is more or less star-like in form and which is regarded as scrap or waste material after the articles have been separated therefrom.

In producing knob-like articles by injection molding in the manner briefly explained above, it has heretofore been the practice to form the gate opening so that the branch passages thereof provide the shortest and most direct path to the individual mold cavities to thereby reduce the amount of waste material contained in the gate and also to locate the arms of the gate in the parting plane of the mold so that the gate can be readily ejected. It has also been customary to form the individual mold cavities with a taper extending relative to the parting plane such that the articles will be readily removable from the mold with the gate. In observing the factors or requirements just mentioned for multiple-cavity molds, the knobs or like articles heretofore produced in such molds have been connected with the gate at a point on the convex exterior of the article and lying at or near its top or larger end. In other words, the point of connection of the article with the gate has heretofore been on the exterior surface which, in the finished article, is usually a smooth surface having a high polish and exposed to view when the article is in its ordinary position of use. As is well known to persons skilled in this art, the breaking of the individual articles from the arms or stems of the gate frequently results in an irregular spot or indentation being left on the exterior surface and the article must either be subjected to an additional smoothing operation requiring added labor and machinery or, if the irregularity is too extreme or pronounced for such treatment, the article must be scrapped or discarded.

I find that the expense of the above-mentioned additional smoothing operation can be largely avoided and the percentage of scrap or imperfect articles can be greatly reduced by using a mold of improved construction and by carrying out the molding operation so that the point of connection of the articles with the arms of the gate will not be on the convex exterior of the article which is normally exposed to view, but will be on a surface portion or section thereof which is more or less concealed when the article is in its ordinary position of use. When the articles being molded are knobs or like articles, I locate this point of connection so that it will lie on the reduced inner end face which is more or less concealed when an article of this character is in its ordinary position of use. As will be explained more in detail hereinafter, I obtain these desired results by the use of an improved mold having a novel arrangement for the gate opening and passages, and also having novel ejecting means by which the articles can be automatically disconnected from the gate.

It is therefore an object of the present invention to provide improved apparatus for the molding of articles from plastic material, in which a novel arrangement of passages is employed for supplying the material to the mold cavity or cavities such that articles of more satisfactory form are obtained directly from the mold and a much smaller percentage of articles is required to be scrapped or subjected to special treatment for the removal of irregularities.

Another object of my invention is to provide improved molding apparatus of the character referred to, having a novel arrangement of gate passages by which the plastic material is introduced into the individual mold cavities through a section or surface thereof corresponding with a surface or portion of the article which is more or less concealed when the article is in its ordinary position of use.

Still another object of my invention is to provide improved molding apparatus for producing articles from plastic material in which the gate opening for supplying the plastic material has branch passages leading to the individual mold cavities and lying inwardly of the parting plane of the mold and in which novel means is employed for separating the articles from the gate at or during the ejection of the articles from the mold.

My invention may be further briefly summarized as consisting in certain novel combinations and arrangements of parts hereinafter described and more particularly set out in the appended claims.

In the accompanying sheet of drawings,

Fig. 1 is a longitudinal sectional view taken through apparatus for molding articles from plastic material in accordance with my invention;

Fig. 2 is a similar longitudinal sectional view taken through such molding apparatus but showing the mold opened;

Fig. 3 is a partial face view of the inner mold member taken as indicated by line 3—3 of Fig. 1 and further illustrating the gate passages;

Fig. 4 is a perspective view showing an article produced by the apparatus of Figs. 1 and 2 just after the article has been ejected from the mold and having a portion of the gate remaining thereon;

Fig. 5 is a perspective view showing the same article, but with the gate portion removed therefrom; and Fig. 6 is a perspective view showing the gate after it has been ejected from the mold.

More detailed reference will now be made to the accompanying drawing in which I have illustrated one arrangement of molding apparatus which I regard to be satisfactory for molding articles from plastic material in accordance with my invention. It will be understood, however, that while the illustrated apparatus is hereinafter described in considerable detail, the invention is not to be regarded as limited thereto, but is applicable to various other forms and arrangements of apparatus of this type.

As above indicated, my improvement in the molding of plastic material may be applied to articles of various kinds and types, but is especially applicable to the molding of small articles of more or less knob-like form, such as operating knobs for radio apparatus and for various controls and operating members of automobiles. In Figs. 4 and 5 I show a knob or handle 10 of this type which is formed of molded thermoplastic or thermosetting material and has a metal insert therein forming a projecting stem or spindle 11 by which the knob may be connected with the member or control to be operated. The knob here shown has a rounded outer end or top 12 which is relatively larger than the inner end or bottom 13 from which the spindle 11 projects. As is usual with articles of this type produced by injection molding of plastic material, the knob 10 tapers in size from its relatively larger end 12 toward its smaller inner end or bottom 13. As shown in this instance, the knob may be hollow or may be provided with a plurality of recesses 14 extending thereinto from its inner or bottom end 13 to reduce the amount of material contained in the article.

The knob 10, as obtained from the mold, has a finger-like projection or stem 15 integrally connected therewith and projecting therefrom at a point on the inner or bottom end 13. As will be explained more fully hereinafter, this stem 15 is a portion of the gate formed in the passage through which the material was introduced into the mold cavity in which the knob 10 was molded. The article as shown in Fig. 4 is in the condition in which it is ejected from the mold and thereafter the stem or projection 15 is broken or otherwise separated from the article leaving thereon a more or less inconspicuous spot on the inner end or bottom 13 as shown in Fig. 5. When the knob 10 is mounted in its ordinary position of use, such as on a radio set or dash control member of an automobile, the inner end 13 lies adjacent a portion of the apparatus with which the knob is used and the spot resulting from the removal of the stem 15 is effectively concealed. Since this spot does not lie on the polished convex exterior of the knob which is exposed to view, but is more or less concealed, it is not necessary to subject the article to any treatment for the removal or obliteration of the spot.

In Figs. 1 and 2 I show molding apparatus for producing articles such as the knob of Fig. 10 in accordance with my invention. This apparatus may be a part of a molding machine of the injection type commonly used in this art and may include a pair of die carrying plates or platens 18 and 19. The apparatus also includes a mold 21 formed by a pair of cooperating but separable mold members 22 and 23 carried, respectively, by the platens 18 and 19. This mold, as will be explained more in detail hereinafter, contains a plurality of individual cavities 24 of the shape of the knobs 10 to be produced, and also contains a gate opening or sprue opening 25 through which the plastic material is introduced and from which a gate 26 is ejected upon completion of each molding operation.

The platen 18 may be a stationary platen carried by a frame portion or bolster 20. The platen 19 may be movable toward and from the platen 18 for closing and opening the mold 21 and may have an opening 19a therein. Movable with the platen 19 is a cylinder or device 27 which extends into the opening 19a and is adapted to contain the plastic material and to heat the same and deliver it under pressure through the opening of a nozzle 28 into the gate opening 25 of the mold.

In addition to the members 22 and 23 the mold 21 also comprises die members or inserts for forming the individual mold cavities 24. These inserts will vary in size and shape according to the size and shape of the articles to be produced, and in this instance consist of inserts 29 mounted in the member 23 for molding the outer or top portion of the articles, and inserts 30 and 31 mounted in the stationary member 22. The insert 30 has an inwardly converging tapered opening 32 and an inner end face or bottom wall 33 for correspondingly shaping the tapered side and inner end of the article. The insert 31 carries projections 34 which extend into the mold cavity as cores for forming the openings 14 in the article. The mold 21 may be provided with any desired number of cavities and in this instance is shown as having six cavities. It will be understood, of course, that a set of the inserts 29, 30 and 31 is provided for each mold cavity.

For admitting the plastic material to the mold cavities 24 from the gate opening 25 I provide the latter with branch passages extending to the respective mold cavities as shown in Figs. 1 and 3. The branch passage for each cavity may consist of a radial passage 35, an inclined passage 36 and an axial passage 37 connecting the outer end of the radial passage with the inner end of the inclined passage. The radial passages 35 may be grooves of appropriate depth formed in the mold member 22, as shown in Fig. 3 and lie at the parting plane. The axial passages 37 extend away from the parting plane and into the mold member 22 and may be grooves formed in the side wall of the openings in which the inserts 30 and 31 are mounted. The passages 36 start at the inner end of the axial passages 37 and extend in inclined relation back toward the parting plane and lead into the cavities 24 through the inner end face or bottom wall 33 thereof. These inclined passages lie wholly inwardly of the parting plane and may be formed by grooves provided in the insert or die member 31.

When the mold 21 is closed and the plastic material is forced in through the nozzle 28 and the gate opening 25 it follows the branch passages 35, 37 and 36 in succession and fills the mold cavities 24. The gate opening and the branch passages become filled with the plastic material as well as the mold cavities and form the stem portion 25a and the arms 35a and 37a of the gate 26.

The gate opening 25 is tapered and diverges inwardly away from the nozzle 28 so that upon opening of the mold 21 by movement of the member 23 away from the member 22, the tapered stem 25a of the gate 26 can be readily withdrawn from the opening 25. It is desirable to hold the gate 26 and the articles 10 in the mold member 22 during the initial opening of the mold and for this purpose an interlock is provided between the gate and the center pin 39 of the ejecting mechanism 40. To this end the gate opening 25 may be provided with an axial extension 41 in which the ejector pin 39 is slidable. The outer end of this ejector pin has an undercut recess 42 which interlocks with the stem 41a formed on the gate 26 by the plastic material which is forced into the extension portion 41 of the gate opening. With this arrangement it will be seen that upon opening of the mold by movement of the platen 19 and the mold member 23 away from the mold member 22, the ejector pin 39 will temporarily hold the gate 26 in the mold member 22 and cause the withdrawal of the tapered stem 25a from the gate opening.

The tapered gate opening 25 and the axial extension 41 may be formed directly in the mold members 23 and 22 but preferably, and as here shown, are formed in inserts 44 and 45 which are carried by the respective mold members. When the mold is opened after the required period for the solidification of the material, the inserts 29 and 44 move with the mold member 23 as will be readily seen from Fig. 2, causing the relatively larger outer ends of the articles 10 and the gate 26 to be exposed in the die member 22 whereupon the articles and gate are ready to be ejected.

It will be noted that since the angularly extending branch passages 36 leading to the individual mold cavities 24 lie inwardly of the parting plane of the mold, the stems 15 which are formed by the plastic material contained in these passages prevent the gate 26 and the articles 10 from being ejected as a unit from the mold member 22. Therefore in order to remove the gate and the articles from the mold member 22, I provide the ejector pins 46 and 47 in addition to the above-mentioned center ejector pin 39 and use the pins 47 for cutting the inner end of the stems 15 loose from the inner end of the stems 37a to free the articles 10 from the gate 26. One pair of the ejector pins 46 and 47 is provided for each of the individual mold cavities 24, and as will be seen from the drawing, the pins 46 are arranged to slide in openings of the inserts 31 and the pins 47 slide in openings formed in the platen 18 in substantial alignment with the branch passages 37. When the articles being formed are to be provided with an insert such as the metal insert 11 shown in this instance, the outer end of the ejector pins 46 may have a recess in which such insert may be mounted prior to the closing of the mold. The outer ends of the pins 47 may be flattened or otherwise reduced in cross-section to have a snug sliding fit in the axial passages 37. The ejector pins 39, 46 and 47 may be carried by a common head 50 which is movable in a recess 51 of the frame portion 20, and may be actuated by a suitable shaft or stem 52. The pins 46 preferably have limited sliding movement in the head 50 as permitted by the spaced collars 46a provided on these pins.

During the opening of the mold the platen 19 and mold member 23 move away from the mold member 22 to expose the articles 10 and the gate 26, as above explained, and during or immediately following this movement the head 50 is shifted toward the right in the recess 51 by suitable actuation of the stem 52. This causes the ejector pins 39 and 47 to act on the gate 26 tending to eject the same from the mold member 22. This movement of the head 50 also causes a similar, but somewhat delayed, movement of the ejector pins 46 tending to eject the articles 10 from the mold cavities 24. During the initial outward movement of the ejector pins 47 their outer ends shear or cut the gate 26 loose from the articles 10. This is accomplished by the outer ends of the ejector pins 47 moving into the passages 37 and thereby shearing the inner ends of the axially extending arms 37a from the inner ends of the angularly extending stem portions 15 which are connected with the articles and lie in the passages 36. Continued movement of the ejector pins toward the right causes the articles 10 to be pushed out of the cavities of the mold member 22, as shown in Fig. 2, and during this ejecting movement the stems 15 are withdrawn from the angular passages 36. Inasmuch as the material is still in a warm and relatively soft condition, the stems 15 will deflect a sufficient amount to permit them to be easily withdrawn from the inclined or angular passages 36. When the articles are thus ejected from the mold member 22 by the pins 46, they may be allowed to drop from between the mold members into a suitable chute or receptacle. The gate 26 after being pushed from the mold member 22 by the pins 39 and 47 may also drop out from between the mold members, or if it remains connected with the ejector pin 39, it can be readily loosened therefrom by the operator.

From the foregoing description and the accompanying drawing, it will now be readily seen that I have provided improved molding apparatus for forming knobs or other articles from plastic material and the use of which permits such articles to be more economically produced inasmuch as fewer articles are required to be scrapped and smoothing operations heretofore required have been reduced or eliminated. It will be seen furthermore that in my improved mold arrangement the gate opening and passages for supplying the plastic material to the individual molds are arranged to open into the molds at a point corresponding with a surface portion or face of the article which is more or less concealed when the article is in its ordinary position of use. Moreover, it will be seen that by utilizing the ejector pins for shearing the gate to loosen the individual articles therefrom, the branch passages for supplying the plastic material to the individual mold cavities can be located inwardly of the parting plane of the mold members.

While I have illustrated and described the construction and use of my improved molding apparatus in a more or less detailed manner, it will be understood, of course, that I do not wish to be limited to the particular details and arrangements herein disclosed, but regard my invention as including such changes and modifications as do not constitute a departure from the spirit of the invention and the scope of the appended claims.

Having thus described my invention, I claim:

1. In apparatus for molding articles which are oppositely tapered in both directions proceeding from an intermediate region of greatest cross sectional area, a pair of mold members having relatively confronting recesses, together defining a cavity of the shape of the desired article and having a parting plane adjacent the said intermediate region of the cavity, means for introducing plastic material into said cavity under pressure including a gate passage for supplying plastic material to the cavity extending through one mold member and having a branch passage communicating with the reduced inner end extremity of the tapered recess of the other member, said supply passage being disposed substantially laterally of said cavity and said branch passage extending generally laterally to effect communication between said supply passage and the extreme reduced end of the tapered recess of said other mold member, and ejecting mechanism for discharging the article from the mold including means movable to shear the stem of material in said branch passage for cutting the article loose from the gate material formed in the gate passage.

2. In apparatus for molding plastic material, a pair of mold members having cooperating recessed portions defining a cavity of the shape of the article to be produced and being separable to permit release of the molded article from said cavity, a supply passage for the plastic material extending through one mold member and across the parting plane into the other mold member to a point beyond the relatively remote end of the recess of said other mold member and having a portion extending thence in relatively inclined relation toward the parting plane and connecting with said cavity adjacent the said remote end of the latter, means for forcing plastic material through said passage into said cavity, means movable in said other mold member to sever the solidified plastic material in said passage adjacent said inwardly disposed point, and means operable to cause ejection of the article from said cavity so as to withdraw the solidified material from said relatively inclined passage portion.

3. In apparatus for molding plastic material, a pair of mold members having cooperating confronting portions defining a group of cavities of the shape of the articles to be produced and being separable along a parting plane to permit release of the molded articles from said cavities, a supply passage for the plastic material extending through one mold member and having branch passages corresponding in number with said cavities and extending into the other mold member to a point beyond the relatively remote ends of said other mold cavities and continuing branch passages extending thence in relatively inclined relation back toward the parting plane and connecting with the respective cavities adjacent their said remote ends, means for forcing plastic material through said passages into said cavities, means movable in said other mold member to sever the stems of solidified material in said relatively inclined branch passages adjacent their junction with the other branch passages, and means operable to cause ejection of the articles from said cavities so as to withdraw the solidified material from said relatively inclined branch passages.

4. In molding apparatus of the character described, a pair of relatively movable mold members defining a cavity of the shape of the article to be produced and being separable to permit the ejection of the molded article, means for supplying plastic material to said cavity through a passage communicating therewith, a head movable relative to one of said mold members, a cutter movable in said one mold member and having rigid connection with said head for actuation thereby to cut the stem of material in said supply passage, an ejector pin movable in said one mold member and adapted to engage the article, and means providing a lost-motion connection between said movable head and pin and adapted to cause actuation of the latter after actuation of the cutter.

5. In molding apparatus of the character described, a pair of stationary and movable mold members having cooperating recessed portions defining mold cavities of the shape of the articles to be produced, said cavities being arranged in an annular series, means for actuating the movable mold member, means for supplying plastic material to said cavities under pressure including a supply passage extending through the movable mold member substantially centrally of said annular series and branch passages radiating from such central passage and communicating with said cavities, said branch passages being arranged to extend into said other mold member and having portions thereof spaced from the parting plane, a head movable relative to said other mold member, cutters movable in said one mold member and having rigid connection with said head for actuation thereby to cut the stems of material in said branch passages, and ejector pins movable into the respective cavities and having lost-motion connection with said head so as to be actuated thereby after actuation of the cutters.

ORLO W. MARSH.